US009098653B2

(12) United States Patent
Letz et al.

(10) Patent No.: US 9,098,653 B2
(45) Date of Patent: *Aug. 4, 2015

(54) VERIFYING PROCESSOR-SPARING FUNCTIONALITY IN A SIMULATION ENVIRONMENT

(71) Applicant: International Business Machines Corporation, Armonk, NY (US)

(72) Inventors: Stefan Letz, Boeblingen (DE); Joerg Deutschle, Winnenden (DE); Bodo Hoppe, Tamm (DE); Erica Stuecheli, Austin, TX (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/079,802

(22) Filed: Nov. 14, 2013

(65) Prior Publication Data

US 2014/0074451 A1 Mar. 13, 2014

Related U.S. Application Data

(63) Continuation of application No. 13/285,460, filed on Oct. 31, 2011.

(51) Int. Cl.
*G06F 17/50* (2006.01)
*G06F 11/22* (2006.01)
*G06F 11/20* (2006.01)

(52) U.S. Cl.
CPC ........ *G06F 17/5009* (2013.01); *G06F 11/2242* (2013.01); *G06F 17/5022* (2013.01); *G06F 11/202* (2013.01); *G06F 2217/68* (2013.01)

(58) Field of Classification Search
CPC  G06F 11/2242; G06F 11/2217; G06F 11/202
See application file for complete search history.

(56) References Cited

U.S. PATENT DOCUMENTS 5,214,652 A * 5/1993 Sutton ............................ 714/10
6,189,112 B1   2/2001 Slegel et al.
(Continued)

OTHER PUBLICATIONS

Victor, D. W.; Ludden, J. M.; Peterson, R. D.; Nelson, B. S.; Sharp, W. K.; Hsu, J. K.; Chu, B.-L.; Behm, M. L.; Gott, R. M.; Romonosky, A. D.; and Farago, S. R. 2005. Functional Verification of the POWER5 Microprocessor and POWER5 Multiprocessor Systems. IBM Journal of Research and Development 49(4/5): 541-554.*

(Continued)

*Primary Examiner* — Omar Fernandez Rivas
*Assistant Examiner* — Robert Brock
(74) *Attorney, Agent, or Firm* — DeLizio Law, PLLC

(57) ABSTRACT

A simulation environment verifies processor-sparing functions in a simulated processor core. The simulation environment executes a first simulation for a simulated processor core. During the simulation, the simulation environment creates a simulation model dump file. At a later point in time, the simulation environment executes a second simulation for the simulated processor core. The simulation environment saves the state of the simulated processor core. The simulation environment then replaces the state of the simulated processor core by loading the previously created simulation model dump file. The simulation environment then sets the state of the simulated processor core to execute processor-sparing code and resumes the second simulation.

11 Claims, 5 Drawing Sheets

(56) References Cited

U.S. PATENT DOCUMENTS

| | | |
|---|---|---|
| 6,574,748 B1 | 6/2003 | Andress et al. |
| 7,409,330 B2 | 8/2008 | Kumamoto |
| 7,770,063 B2 | 8/2010 | Robertson et al. |
| 8,073,668 B2 | 12/2011 | Kellington et al. |
| 8,249,848 B2 | 8/2012 | Letz et al. |
| 8,600,724 B2 | 12/2013 | Letz et al. |
| 2004/0230865 A1* | 11/2004 | Balazich et al. ............ 714/13 |
| 2006/0184771 A1 | 8/2006 | Floyd et al. |
| 2006/0229861 A1* | 10/2006 | Tatsuoka et al. ............ 703/21 |
| 2008/0163255 A1 | 7/2008 | Munoz et al. |
| 2008/0235454 A1 | 9/2008 | Duron et al. |
| 2008/0306721 A1 | 12/2008 | Yang |
| 2009/0070563 A1 | 3/2009 | Conklin et al. |
| 2009/0150732 A1* | 6/2009 | Jung et al. .................... 714/731 |
| 2009/0259899 A1 | 10/2009 | Ludewig et al. |
| 2010/0192012 A1 | 7/2010 | Parulkar |
| 2013/0110490 A1 | 5/2013 | Letz et al. |

OTHER PUBLICATIONS

Authors Unknown, "Regression Testing", Wikipedia entry as archived on Oct. 29, 2010, as obtained from http://en.wikipedia.org/w/index.php?title=Regression_testing&oldid=393657470 on Nov. 3, 2014, 4 pages.*

Henderson et al, "POWER7® System RAS : Key Aspects of Power Systems™ Reliability, Availability, and Serviceability", IBM Server and Technology Group, (Aug. 2010), 55 pages.*

Laosooksathit, Supada et al., "Lightweight Checkpoint Mechanism and Modeling in GPGPU Environment", HPCVirt 2010 Workshop http://eurosys2010-dev.sigops-france.fr/workshops/HPCVirt2010/hpcvirt2010_1.pdf 2010 , 7 pages.

* cited by examiner

VERIFYING PROCESSOR-SPARING FUNCTIONALITY IN A SIMULATION ENVIRONMENT

RELATED APPLICATIONS

This application is a Continuation of and claims the priority benefit of U.S. application Ser. No. 13/285,460 filed Oct. 31, 2011.

BACKGROUND

Embodiments of the inventive subject matter generally relate to the field of processor simulation systems, and, more particularly, to verifying processor-sparing functionality in a simulation system.

Computer system makers and computer processor makers continually strive to produce faster and more reliable computer systems. One way that computer systems are made faster and more reliable is to provide a multiprocessing computer system. A multiprocessing computer system is comprised of multiple processor cores. A multiprocessing computer system can be implemented using multiple single-core processors or one or more multi-core processors. The multiprocessing computer system is faster because the multiple processor cores can be made to execute tasks in parallel with one another. The multiprocessing computer system can be made more reliable because in the event of a failure, another processor core of the multiprocessing computer system can take over the functions formerly provided by the failed processor core and continue the programs that were executing on the failed processor core at the time of the failure. The capability to move programs from one processor core of a multiprocessing computer system to another processor core is referred to as processor-sparing.

While designing a computer system with a single processor core is complicated, designing a multiprocessing computer system that provides processor-sparing is even more complicated and susceptible to errors.

SUMMARY

Embodiments include a simulation environment for simulating one or more processor cores. The simulation environment executes a first simulation for a simulated processor core. During the simulation, the simulation environment creates a simulation model dump file. At a later point in time, the simulation environment executes a second simulation for the simulated processor core. The simulation environment saves the state of the simulated processor core. The simulation environment then replaces the state of the simulated processor core by loading the previously created simulation model dump file. The simulation environment then sets the state of the simulated processor core to execute processor-sparing code and resumes the second simulation.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

The embodiments provide a simulation environment that can be used to test processor-sparing functionality. In multiprocessing computer systems, processor-sparing functionality is invoked when a non-recoverable error occurs on a processor core. In such a case, the system transfers the last good architected state of the processor core to another processor core, which resumes execution of the programs formerly handled by the failed processor core. The processor-sparing functionality typically involves logic, low-level firmware (sometimes referred to as millicode) and high-level firmware. The low-level firmware comprises firmware that supports processor operations and is typically not exposed to end users of the processor. High-level firmware may be seen by end users, and may include a hypervisor (i.e., a virtual machine manager), input/output functions and other support functions.

Previous methods of testing processor-sparing functionality involved test engineers manually determining processor core state values. Such a manual process does not provide the coverage required to confidently test processor-sparing logic and code, and does not generally provide realistic test scenarios.

The embodiments use test cases to generate simulation model dump files that accurately reflect the state of a processor core during testing of various functions such as logic functions, floating-point functions, memory functions, cryptography functions and other functions provided by a processor core. The simulation model dump files thus represent actual processor core states that may be encountered during a processor-sparing operation. The simulation model dump files are then later used during test cases that test the functioning of the processor-sparing logic and code.

The use of simulation model dump files during the testing of processor-sparing logic and code provides realistic scenarios that can be used in automated regression testing of a processor core design.

Figure 1:
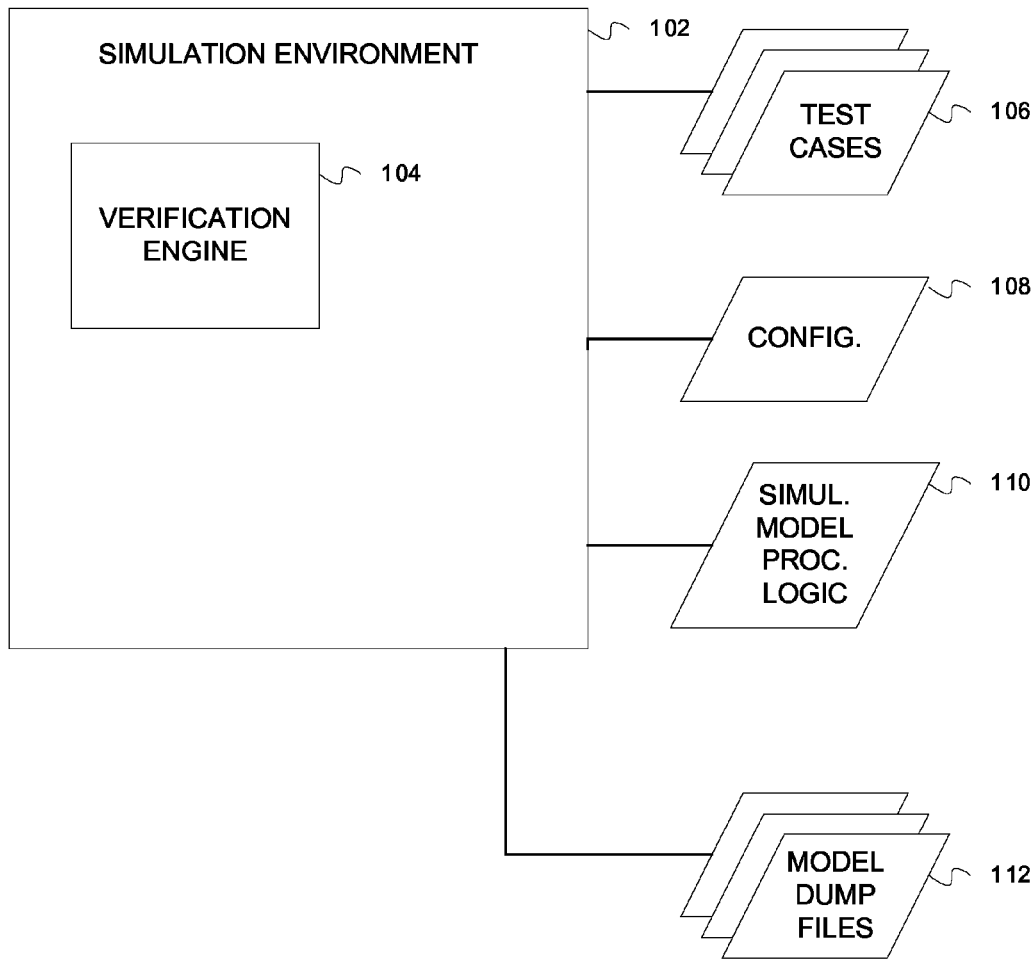
FIG. 1 depicts logical components of a processor core simulation environment.

FIG. 1 is a diagram depicting logical components of a processor core simulation environment. In general, simulation environment 102 provides a hardware and software framework for verifying that a processor core design will function properly before the processor core is actually manufactured. Simulation model 110 comprises data describing the design of a processor core. Simulation model 110 includes data representing various components of a processor core such as the electronic logic and memory for the processor core, and further includes data describing how the components are connected and other operational details of the processor core. An example of a simulation model used in some embodiments is a logical netlist generated out of VHDL (Very high speed integrated circuit Hardware Description Language).

Test cases 106 comprise data that describes various tests that can be executed to test aspects of a processor core. For example, various test cases may exercise the arithmetic logic, floating-point operations, memory operations and cryptography operations of a processor core. Test cases 106 include the instructions for the test case, the initial values of registers and memory, input stimuli, and the expected results for the test cases. In some cases, the data for a test case is provided in a text file referred to as an architecture verification program (AVP) file.

Simulation environment 102 reads the simulation model 110 and the test cases, and executes the test cases against a simulated processor core that operates according to the design specified in simulation model 110. Verification engine 104 emulates the instruction execution cycles of a processor designed according to simulation model 110. In other words, verification engine 104 and the simulation environment 102 simulate how a processor core specified by simulation model 110 would execute the instructions in the test case given the initial conditions and stimuli provided in the test case. If the expected results are achieved, then the test case is considered passed. If the expected results are not achieved, the test case is considered failed. A failure of a test case may indicate an error in the design of the processor core.

Configuration 108 provides data that can be used to turn on or off features of the verification engine, simulation environment or test cases.

Simulation environment 102 is capable of creating simulation model dump files 112. A simulation model dump file 112 comprises data describing the state of a simulation model at a particular point in time. The simulation state includes an architected state, e.g., the state of registers and other components that are exposed (i.e., documented) to end-users for their use in designing hardware or software that uses or interfaces with the processor. The simulation state may also include a non-architected state. The non-architected state includes the state of non-architected registers, signals or other components that are not exposed to end-users. The non-architected registers and components may be used internally for system operation and maintenance.

Further details on the operation of the above-described system are provided below.

Figure 2:
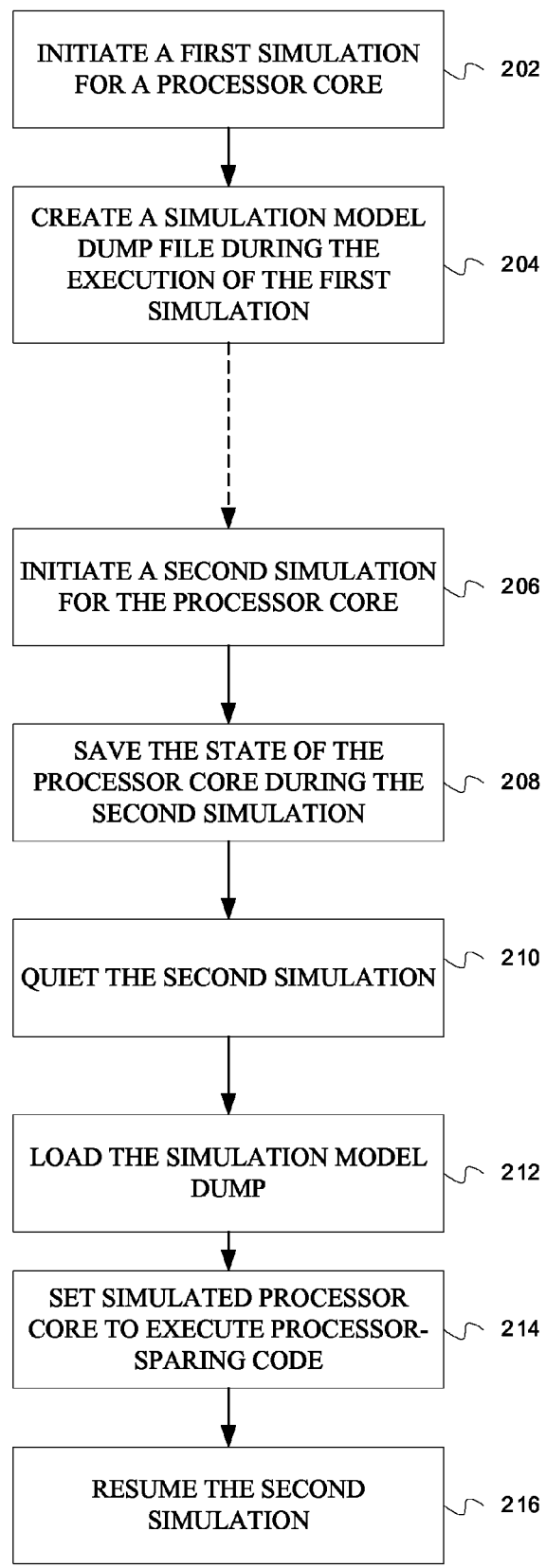
FIG. 2 is a flowchart depicting a method for verifying processor-sparing functionality.

FIG. 2 is a flowchart depicting a method 200 for verifying processor-sparing functionality. The method begins at block 202, where a simulation environment initiates a first simulation for a processor core. The first simulation is based on at least one test case 106.

At block 204, at some point during the execution of the first simulation, the simulation environment creates a simulation model dump file 112. In some embodiments, execution of the test case may be allowed to continue after the simulation model dump file is created, or it may be terminated.

The operations at blocks 202 and 204 may be performed numerous times to generate different simulation model dump files for later use. For example, blocks 202 and 204 may be executed for different types of test cases so that the simulation model dump files created during the test cases exercise different aspects of the processor core. For example, simulation model dump files may be created during test cases for arithmetic logic units, floating-point units or cryptographic units so that the simulation model dump files represent the state of a processor core while such units are in operation. In some embodiments, pools or groups of simulation model dump files are created, with each pool or group representing combinations of simulation model dump files that were generated using particular types of test cases (e.g., arithmetic logic test cases, floating-point test cases or cryptography test cases). Each pool may contain enough test cases to provide sufficient coverage of different potential processor core states. In some embodiments, a pool will contain ten simulation model dump files.

At block 206, the simulation environment initiates a second simulation for the processor core. Like the first simulation, the simulation environment performs the second simulation according to at least one test case.

At block 208, at a point in time during the execution of the second simulation, the simulation environment saves the architected state of the processor core. The simulation environment saves the architected state in simulated memory coupled to the simulated processor core at a memory location in the simulated memory where an actual checkpoint operation would save the state. The saved state is thus the same state that would be saved as a result of a checkpoint operation executed as a result of a processor core failure or other non-recoverable error that would initiate processor-sparing had it occurred in an actual processor core.

At block 210, the simulation environment quiets the second simulation. The simulation environment allows instructions currently in the pipeline to finish, but does not initiate any new instructions. The simulation environment allows simulated input and output operations to finish.

At block 212, the simulation environment loads a simulation model dump file into the verification engine and by doing so replaces the complete state of the simulated processor core.

At block 214, the simulation environment sets the simulated processor core's registers such that the processor-sparing code is executed.

At this point, the simulated processor core and simulated memory are in the same state as in a case where a processor core executing the test case had failed, and the simulated processor core is selected to take over for the failed processor core.

At block 216, the simulation environment resumes execution of the simulation such that the simulated processor core starts to execute the processor-sparing code. Execution of the simulated processor core resumes in the processor-sparing code, which then sets up the simulated processor core with the state saved at block 208. After the processor-sparing code is executed on the simulated processor core, the simulated processor core is in a state to resume execution at the point the test case was saved at block 208. If the test case continues to completion and produces the expected result for the test case, the processor-sparing function is verified to work correctly.

Figure 3:
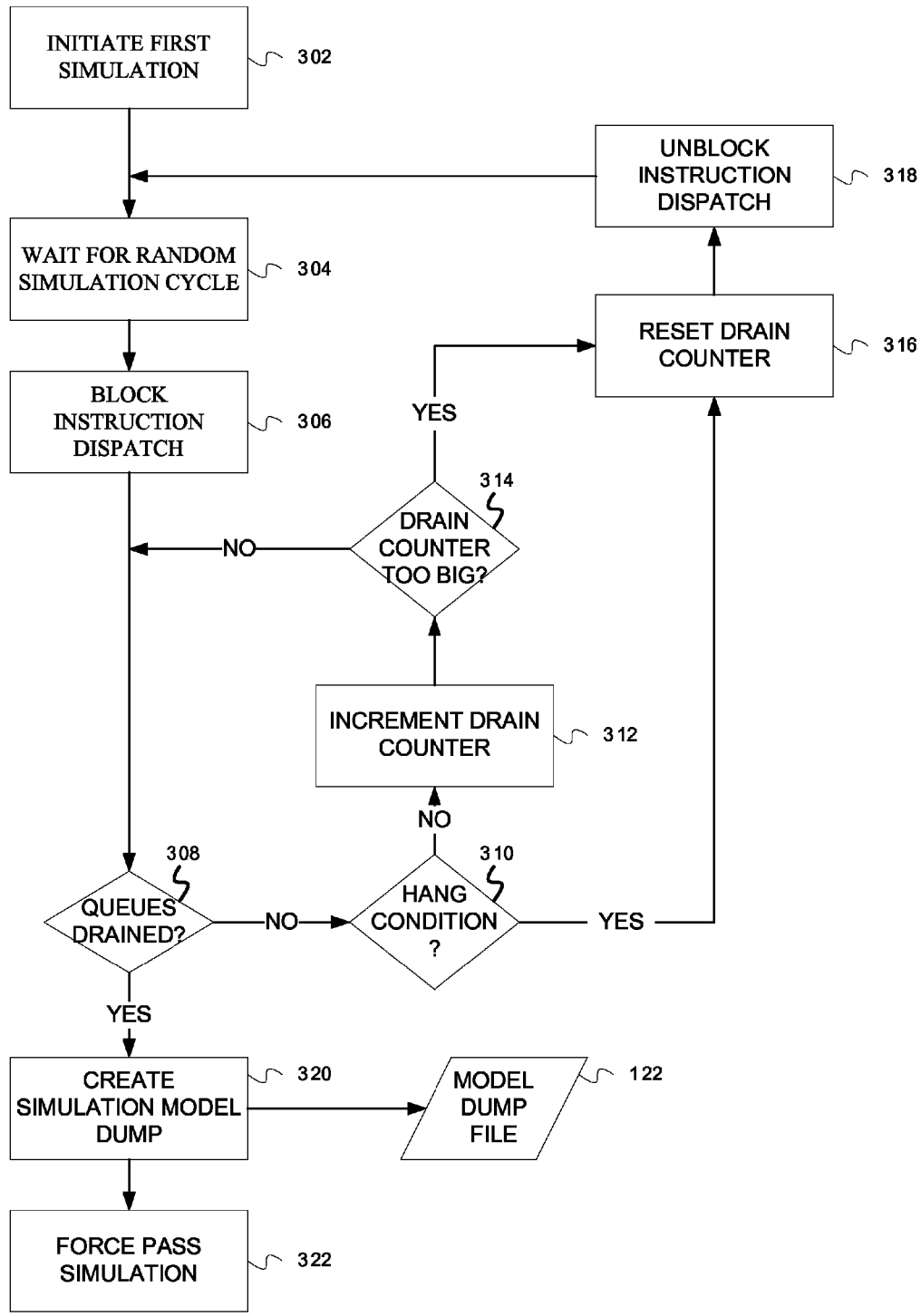
FIG. 3 is a flowchart depicting a method for creating a simulation model dump file in a processor core simulation environment.

FIG. 3 is a flowchart depicting a method for creating a simulation model dump file in a processor core simulation environment and provides further details on the operation of blocks 202 and 204 of FIG. 2. The method begins at block 302 by initiating a first simulation. The simulation environment selects a test case for execution that is known to produce a stable result (i.e., the test case is known to pass for the current processor core design).

At block 304, the simulation environment waits for a random simulation cycle of the first simulation. In some embodiments, the wait period is for a randomly selected number of simulated processor cycles. Alternative embodiments may use a randomly selected time period to wait.

At block 306, the simulation environment blocks instruction dispatch. At this point, instructions and other operations may be in the simulated processor core's instruction pipeline waiting completion. However, no new instructions are allowed to begin.

At block 308, the simulation environment checks to determine if queues for the simulated processor core have drained (i.e., no queue elements are left on any queues). In some embodiments, the queues include one or more of a global completion table (GCT), store queues (STQ) or cryptographic operation (COP) queues. As an example, a queue may not drain if an instruction is waiting for a data fetch from storage.

If the queues have not drained, the simulation environment then checks to determine if a hang condition is present. The simulation environment checks registers, internal core signals and other indicators to determine whether a hang condition is present.

If a hang condition is detected by the simulation environment, then the simulation environment proceeds to block 316. Otherwise the simulation environment proceeds to block 312 to increment a drain counter.

At block 314, the simulation environment determines if the drain counter is too big, indicating that the queues are not draining within an acceptable number of simulation cycles. If the drain counter is too big, then the simulation environment proceeds to block 316, where the simulation environment resets the drain counter.

At block 318, the simulation environment unblocks instruction dispatches, thereby allowing the simulation to resume running the test case. After unblocking instruction dispatch, the simulation environment returns to block 304, where the simulation continues for a random number of simulated processor cycles and is then stopped at a different point in the simulation.

If the check at block 314 determines that the drain counter is not too big, the simulation environment returns to block 308 to check if the queues have drained.

If the check at block 308 determines that the queues have drained, then the simulation environment proceeds to block 320 to create a simulation model dump file 122. The simulation model dump file contains the current state of the simulated processor core, including register values associated with the simulated processor core at the point in time the dump file is created.

At block 322, in some embodiments, the simulation environment forces a pass condition for the test case and terminates the simulation.

The method illustrated above can be repeated using different test cases to create multiple simulation model dump files representing the various realistic states of a processor core.

Figure 4:
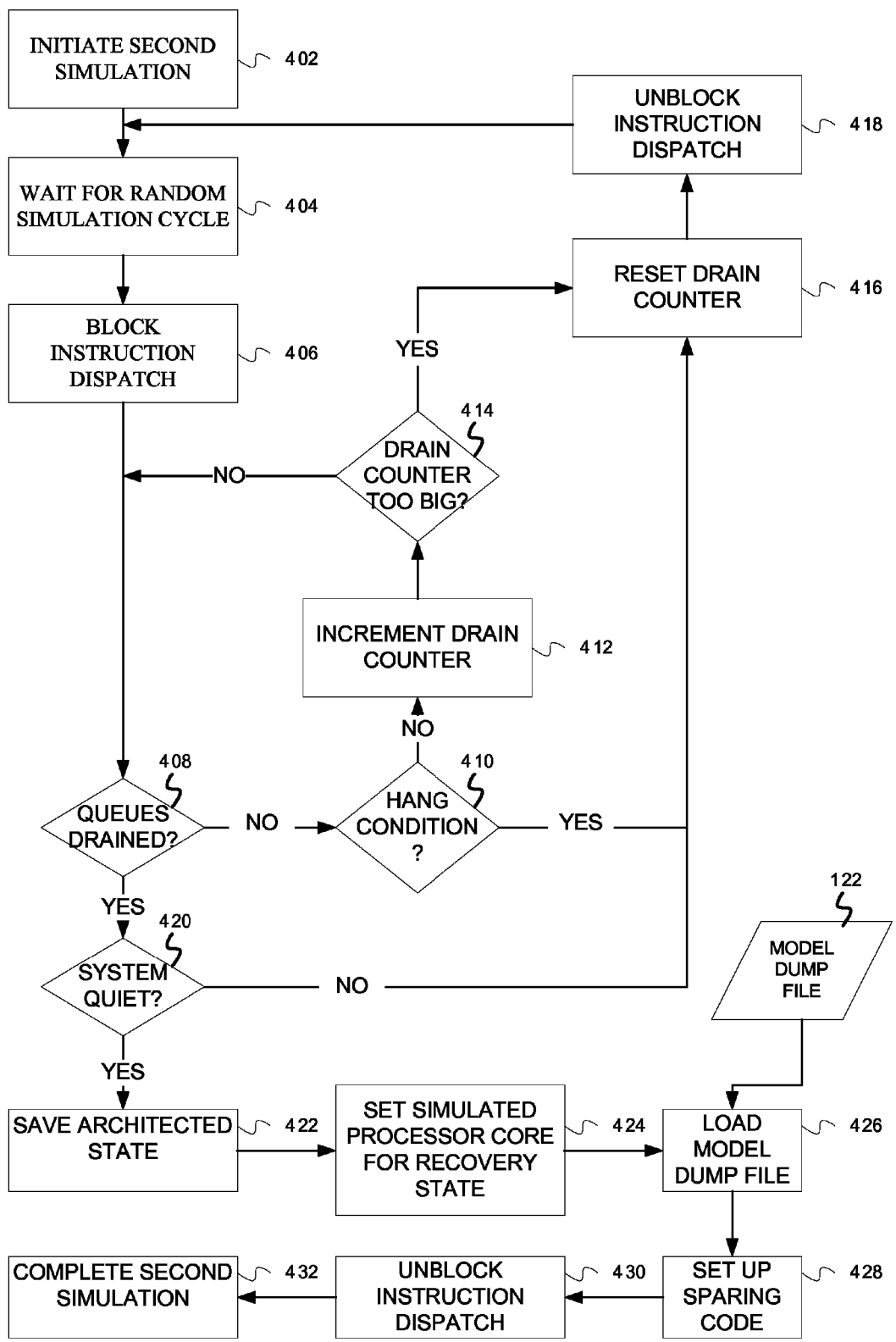
FIG. 4 is a flowchart depicting a method of using a simulation model dump file to verify processor-sparing functionality.

FIG. 4 is a flowchart depicting a method of using a simulation model dump file to verify processor-sparing functionality, and provides further details on the operations of blocks 206-216 of FIG. 2. The method begins at block 402 by initiating a second simulation. The term "second" is used to differentiate the simulation from the first simulation used to generate a simulation model dump file. The second simulation may be a test case 106.

At block 404, the simulation environment waits for a random simulation cycle of the second simulation. In some embodiments, the wait period is for a randomly selected number of simulated processor cycles. Alternative embodiments may use a randomly selected time period to wait.

At block 406, the simulation environment blocks instruction dispatch. At this point, instructions and other operations may be in the simulated processor core's instruction pipeline. However, no new instructions are allowed to begin.

At block 408, the simulation environment checks to determine if queues for the simulated processor core have drained (i.e., no queue elements are left on any queues). In some embodiments, the queues include one or more of a GCT queue, STQ or COP queue.

If the queues have not drained, then at block 410, the simulation environment checks to determine if a hang condition is present. The simulation environment checks registers, signals, and other indicators to determine whether a hang condition is present.

If a hang condition is detected by the simulation environment, then the simulation environment proceeds to block 416 to set the simulation environment to resume the test case. Otherwise the simulation environment proceeds to block 412 to increment a drain counter.

At block 414, the simulation environment determines if the drain counter is too big, indicating that the queues are not draining within an acceptable period. If the drain counter is too big, then the simulation environment proceeds to block 416.

The simulation environment executes blocks 416 and 418 when the drain counter has exceeded a maximum count, indicating that the queues are taking longer than desired to drain, or when the simulated processor core is in a hang state. In this case, the simulation environment takes action to prepare for resumption of the simulation and stopping the simulation at a new randomly selected point in the simulation. At block 416, the simulation environment resets the drain counter.

At block 418, the simulation environment unblocks instruction dispatches, thereby allowing the simulation to resume running the test case. After unblocking instruction dispatch, the simulation environment returns to block 404, where the simulation continues for a random number of simulated processor cycles.

If the check at block 414 determines that the drain counter is not too big, the simulation environment returns to block 408 to check if the queues have drained.

If the check at block 408 determines that the queues have drained, then the simulation environment proceeds to block 420 to determine if the simulation is quiet. The simulation is considered quiet when the simulation is at a point where the simulation memory, registers, and other simulation state values can be replaced without triggering errors in monitoring routines of the simulation environment.

At block 422, the simulation environment saves the architected state of the simulated processor core. As discussed above, the architected state comprises the registers and other state indicators that are exposed to end users. The architected state is saved into simulation memory at the same location that an actual processor core's state would be saved in the event that a processor core failure had occurred.

At block 424, the simulation environment sets the state of the simulated processor core to the state an actual processor core would be in at the start of a recovery operation for processor-sparing. Registers, memory locations, and other processor core state values that are used during a processor-sparing operation may be modified so that their values are consistent with start of a recovery operation that would occur if an actual processor core had failed. In some embodiments, the checks and monitors in the simulation environment that check for invalid processor core states during a simulation are temporarily disabled or relaxed to allow the simulation environment to cope with the unexpected changes to the registers, memory locations, and other state values that occur when a simulation model dump file is loaded.

At block 426, the verification engine loads a simulation model dump file 122 and applies it to the simulation model. The simulation model dump file 122 is one that was previously created using the method described above in FIGS. 2 and 3. Loading the simulation model dump file sets the simulated memory and registers of the simulated processor core into a state that may be encountered during a processor-sparing operation.

At block 428, the simulation environment sets the simulated processor core such that execution will resume at the entry point of code that performs processor-sparing. In other words, the simulated program counter for the simulated processor core is set to the value of the entry point of the processor-sparing code.

At block 430, the simulation environment unblocks instruction dispatch. This allows the simulated processor core to start executing new instructions.

At block 432, the simulation environment allows the test case to run to completion. If the test case produces the expected results, then the processor-sparing code executed during the simulation can be verified as operating correctly. If the test case does not produce the expected results, and previous runs of the test case did produce the expected result, then an error exists in the processor-sparing code executed during the current test case.

The method described above can be repeated using different simulation model dump files and different test cases as input to the simulation. The use of different simulation model dump files during repeated tests using the method can aid in insuring good coverage of the testing of the processor-sparing code.

The flowcharts described above are provided as an example to aid in understanding embodiments, and should not be used to limit embodiments. Embodiments can perform additional operations, fewer operations, operations in parallel or operations in a different order.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software or micro-code) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, infrared, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
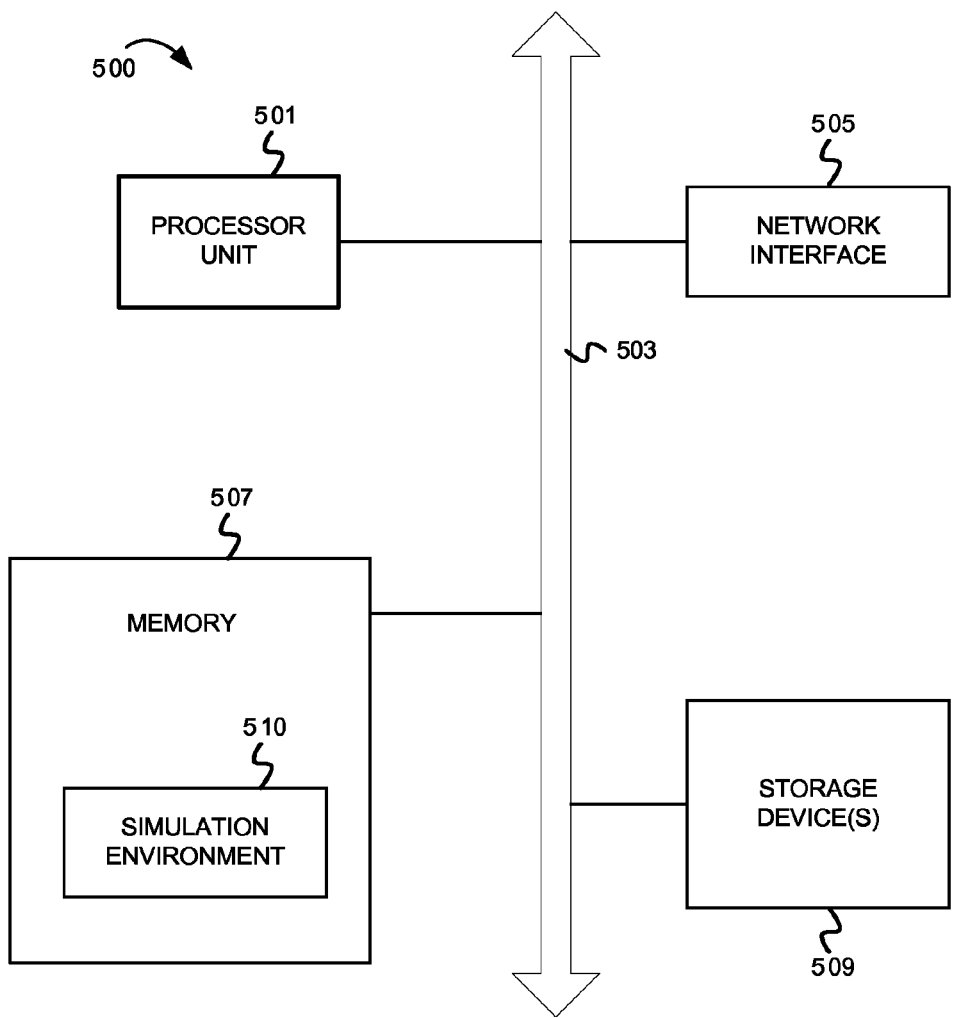
FIG. 5 depicts an example computer system including a simulation environment.

FIG. 5 depicts an example computer system. A computer system includes a processor unit 501 (possibly including multiple processors, multiple cores, multiple nodes, and/or implementing multi-threading). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS or PRAM) or any one or more of the above already described possible realizations of machine-readable media. The computer system also includes a bus 503 (e.g., PCI, ISA, PCI-Express, HyperTransport®, InfiniBand® or NuBus), a network interface 505 (e.g., an ATM interface, an Ethernet interface, a Frame Relay interface, SONET interface or wireless interface), and a storage device(s) 509 (e.g., optical storage or magnetic storage). The system memory 507 embodies functionality to implement embodiments described above. The system memory 507 may include one or more functionalities (e.g., simulation environment 102) that facilitate the method of creating simulation model dump files and using the simulation model dump files in tests of a processor-sparing operation for a simulated processor core. Any one of these functionalities may be partially (or entirely) implemented in hardware and/or software on the processing unit 501. For example, the functionality may be implemented with an application specific integrated circuit, in logic implemented in the processing unit 501, in a co-processor on a peripheral device or card. Further, realizations may include fewer or additional components not illustrated in FIG. 5 (e.g., video cards, audio cards, additional network interfaces or peripheral devices). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for creating a simulation model dump file and using the simulation model dump file during the testing of a processor-sparing operation for a simulated processor as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer implemented method for verifying processor-sparing functions, the method comprising:
   executing, by one or more processors, a first simulation for a simulated processor core;
   blocking instruction dispatch;
   determining whether queues for the simulated processor core have drained;
   unblocking instruction dispatch to continue the first simulation in response to determining that the queues have not drained;
   in response to determining that the queues have drained, creating a simulation model dump during the execution of the first simulation, wherein the first simulation is stored, at least in part, in a computer-readable storage device;
   executing, by the one or more processors, a second simulation for the simulated processor core;
   creating a saved state of the simulated processor core during the second simulation;
   quieting the second simulation;
   replacing, by the one or more processors, a state of the simulated processor core according to a state saved in the simulation model dump;
   setting, by the one or more processors, the simulated processor core to execute processor-sparing code, wherein the processor-sparing code is configured to transfer a last good state of a failed processor core to a different processor core, wherein second simulation configures the simulated processor core as the different processor core; and
   resuming the second simulation.

2. The method of claim 1, wherein creating the simulation model dump includes:
   waiting for a random simulation cycle prior to said blocking instruction dispatch.

3. The method of claim 1, wherein executing the second simulation includes:
   waiting for a random simulation cycle; and
   blocking instruction dispatch.

4. The method of claim 1, wherein setting the simulated processor core to execute the processor-sparing code includes setting a program counter for the simulated processor core to an entry point of the processor-sparing code.

5. The method of claim 1, and further comprising determining if the state of the simulated processor core can be modified without triggering errors in one or more monitoring functions of a simulation environment managing the second simulation.

6. The method of claim 1, wherein setting the simulated processor core to execute the processor-sparing code includes temporarily disabling monitoring functions of a simulation environment, the monitoring functions monitoring the state of the simulated processor core.

7. The method of claim 1, and further comprising waiting for one or more queues in the simulated processor core to drain prior to creating the simulation model dump.

8. The method of claim 1, wherein executing the first simulation is performed by a verification engine, wherein creating the simulation model dump is performed by a simulation system, wherein executing the second simulation is performed by the verification engine, wherein saving the state of the simulated processor core during the second simulation is performed by the simulation system, wherein said quieting the second simulation is performed by the simulation system, wherein loading the simulation model dump is performed by the verification engine, wherein setting the state of the simulated processor core is performed by the simulation system, wherein said loading the simulation model dump is performed by the verification engine, and wherein said resuming the second simulation is performed by the verification engine.

9. The method of claim 1, wherein the simulation model dump comprises a first state of the simulated processor core prior to execution of the processor-sparing code and the saved state comprises the last good state.

10. The method of claim 1, wherein creating the simulation model dump further comprises:

continuing the first simulation for a random number of simulated processor cycles
after instruction dispatch is unblocked.

11. The method of claim 1, further comprising selecting a test case from a pool of test cases directed to a specified logic element of a current simulated processor design, wherein the test case is selected based, at least in part, on the test case having previously passed for the current simulated processor design.

* * * * *